(No Model.)
H. M. HASTINGS.
WINDOW SASH LOCK.
No. 566,171. Patented Aug. 18, 1896.
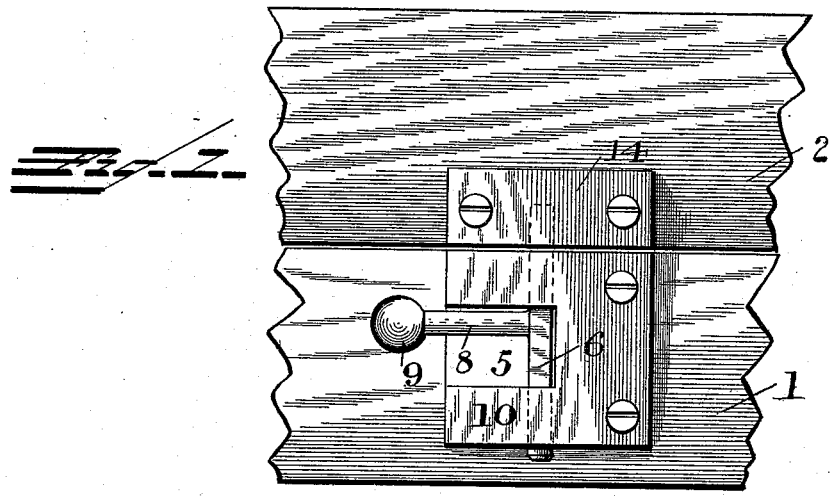
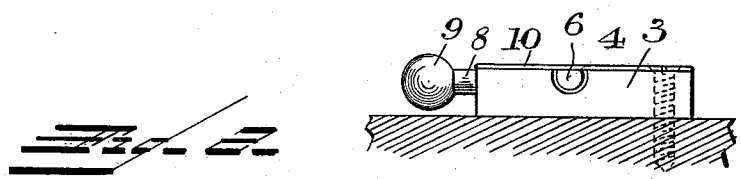
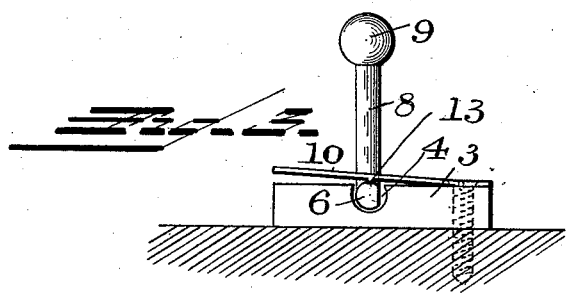
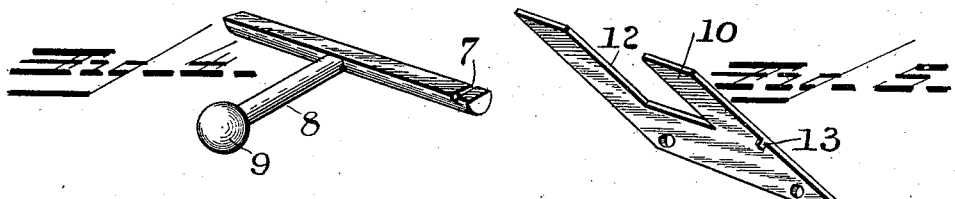
Witnesses:
Franck L. Ourand
W. L. Coombs
Inventor:
Henry M. Hastings,
by Louis Baggu & Co.
Attorneys.

UNITED STATES PATENT OFFICE.

HENRY MILLER HASTINGS, OF COOKSVILLE, ILLINOIS.

WINDOW-SASH LOCK.

SPECIFICATION forming part of Letters Patent No. 566,171, dated August 18, 1896.

Application filed March 9, 1896. Serial No. 582,416. (No model.)

*To all whom it may concern:*

Be it known that I, HENRY MILLER HASTINGS, a citizen of the United States, and a resident of Cooksville, in the county of McLean and State of Illinois, have invented certain new and useful Improvements in Window-Sash Locks; and I do hereby declare that the following is a full, clear, and exact description of the invention, which will enable others skilled in the art to which it appertains to make and use the same, reference being had to the accompanying drawings, which form a part of this specification.

My invention relates to improvements in sash-fasteners designed more especially for fastening the meeting-rails thereof, although it may be used for fastening other objects, if desired.

The object of the invention is to provide an improved construction of fastener which shall possess superior advantages with respect to efficiency in use.

The invention consists in the novel construction and combination of parts hereinafter fully described and claimed.

In the accompanying drawings, Figure 1 is a plan view of the fastener, showing it applied to the meeting-rails of two window-sashes. Fig. 2 is an end view of the same, showing the bolt locked. Fig. 3 is a similar view showing the manner of locking the bolt. Fig. 4 is a perspective view of the bolt detached. Fig. 5 is a similar view of the spring-plate.

In the said drawings the reference-numerals 1 and 2 designate the meeting-rails of two window-sashes. Secured to one of these rails 1 is the fastener or bolt-casing consisting of a rectangular metal block 3, formed with an approximately semicylindrical bolt slot or opening 4, extending from end to end thereof, and with a rectangular recess 5 about the center of the plate at one side thereof. Located in said bolt-opening is the bolt 6, semicylindrical in shape and formed near its inner end with a groove 7. At the center said bolt is provided with a handle 8, having a knob 9. Secured to said block near one edge thereof is a spring-plate 10, having a rectangular recess 12 at its free end, which coincides with the recess 5 in the block. The said spring-plate at one edge is formed or provided with a lug 13, adapted to engage with the groove 7.

The numeral 14 designates the keeper secured to rail 2 and formed with an aperture with which the bolt engages.

The operation is as follows: As shown in Figs. 1 and 2, the bolt is shot or locked, that is to say, one end thereof is engaged with the aperture in the keeper and the lug in the spring-plate engaging with the groove in the bolt, whereby movement of the sashes is prevented and the bolt locked, so that it cannot be retracted until the lug is disengaged from the said groove. To unlock the bolt, the handle is turned upward at a right angle, and the curved portion of the bolt coming in contact with the spring-plate will raise the same, so that the lug will be disengaged from the groove, when the bolt can be retracted.

Having thus fully described my invention, what I claim is—

In a sash-fastener, the combination with the block having a semicylindrical slot extending from end to end thereof and a rectangular recess at one side thereof, of the semicylindrical bolt located in said slot, having a groove near one end and a handle at the center, and the spring-plate having a rectangular recess at one edge, and a lug at one end, secured at one end to said block and bearing upon the bolt substantially as described.

In testimony that I claim the foregoing as my own I have hereunto affixed my signature in presence of two witnesses.

HENRY MILLER HASTINGS.

Witnesses:
ARTHUR ORR,
W. H. ARNOLD.